US010252207B2

United States Patent
Mbadinga Mouanda et al.

(10) Patent No.: US 10,252,207 B2
(45) Date of Patent: Apr. 9, 2019

(54) FILTER ELEMENT FOR FILTERING MEDIA

(71) Applicant: MANN+HUMMEL GMBH, Ludwigsburg (DE)

(72) Inventors: Gelase Mbadinga Mouanda, Laval (FR); Michael Heim, Korntal-Muenchingen (DE); Gunnar-Marcel Klein, Oberstenfeld (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 27 days.

(21) Appl. No.: 14/788,930

(22) Filed: Jul. 1, 2015

(65) Prior Publication Data

US 2016/0016100 A1     Jan. 21, 2016

(30) Foreign Application Priority Data

Sep. 7, 2009 (DE) .......... 10 2009 040 202
Jul. 4, 2014 (DE) .......... 10 2014 009 886

(51) Int. Cl.
*B01D 46/52* (2006.01)
*B01D 46/10* (2006.01)

(52) U.S. Cl.
CPC .......... *B01D 46/522* (2013.01); *B01D 46/10* (2013.01)

(58) Field of Classification Search
CPC .... B01D 46/10; B01D 46/522; B01D 46/521; B01D 46/523; B01D 39/14; B01D 29/016; B01D 2201/127
USPC .... 55/498, 502, 521, 385.3; 210/483, 493.1, 210/493.3, 493.5
See application file for complete search history.

(56) References Cited

U.S. PATENT DOCUMENTS

| 4,486,201 A * | 12/1984 | Noguchi ............ B01D 46/0043 55/302 |
| 5,814,219 A * | 9/1998 | Friedmann ............ B01D 29/111 210/493.3 |
| 6,176,890 B1 | 1/2001 | Svedlind et al. |
| 8,545,658 B2 | 10/2013 | Spearin |
| 8,746,462 B2 * | 6/2014 | Mbadinga-Mouanda .................. B01D 46/521 210/483 |

FOREIGN PATENT DOCUMENTS

| AT | 368402 B | 10/1982 |
| FR | 2490970 A1 | 4/1982 |

* cited by examiner

*Primary Examiner* — Duane Smith
*Assistant Examiner* — Minh Chau T Pham
(74) *Attorney, Agent, or Firm* — James Hasselbeck

(57) ABSTRACT

A filter element for filtering media with a pleated filter medium is described. Each pleat (6) is formed by two pleated sheets which form a pleat tip (7) with one another on the crude side (3) exposed to oncoming flow. Two neighboring pleats (6) form a pleat base (8) with one another, wherein the crude side (3) and/or the clean side (4) of the filter medium has a plurality of elongated adhesive sections along at least two adhesive traces (14), each having at least one adhesive section and each having at least one adhesive interruption (15). The mutual spacing of the two pleated sheets in the region of the pleat tip (7) is between zero and two mm or the two pleated sheets are in contact with one another in the region of the pleat tip (7), wherein the pleat spacing (9) between the two pleated sheets of a pleat pocket (11) amounts to at least twice the pleat spacing in the region of the pleat tip 7 in the region of the pleat base (8).

14 Claims, 4 Drawing Sheets

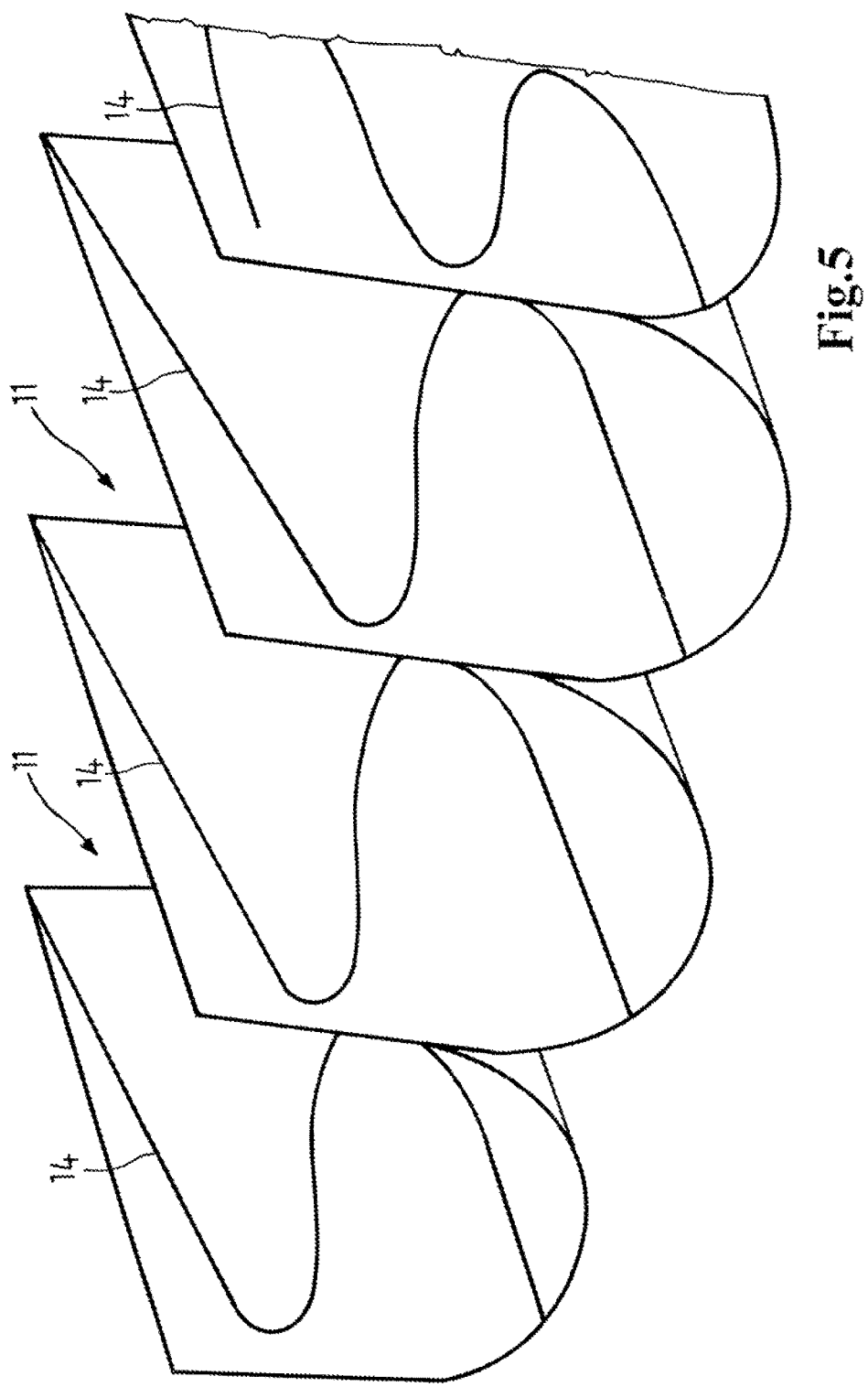

FILTER ELEMENT FOR FILTERING MEDIA

TECHNICAL FIELD

The invention relates to a filter element for a filter for filtering media, in particular gases, in particular intake air, fuel or motor oil, in particular in an internal combustion engine, in particular in a motor vehicle, or ambient air for introduction into ventilation systems in buildings or motor vehicles, having a pleated filter medium with a crude side and a clean side, wherein numerous elongated adhesive sections are arranged along at least two traces of adhesive on the crude side and/or on the clean side of the filter medium, wherein at least one adhesive section and at least one adhesive interruption are arranged on each adhesive trace. The adhesive traces serve in particular to stabilize the filter element and/or to stabilize the pleats.

BACKGROUND

Various filters having pleated filter media are known from the prior art. WO 2007/056567 A1 describes a device and a method for producing pleated filter elements of different pleat heights. WO 2011/026999 A1 describes a plurality of filter elements having adhesive applications in various designs. Additional relevant patent rights include AT 368 402, EP 0 948 986 A1, FR 2 490 970.

SUMMARY OF THE INVENTION

The object of the invention is to create a filter element that is stable, even at great pleat heights, and has the highest possible filter efficiency. The filter element should have a high stability during operation. The flow path of the medium to be filtered should be optimized as much as possible.

The inventor has brought the known means for applying adhesive traces into harmony with the design of the pleats.

A filter element for filtering a medium is proposed, in particular for an internal combustion engine having such pleating that the largest possible storage space is created, which can then accommodate a relatively large volume of particles in medium to be filtered. This storage space is formed between two adjacent filter sheets. The storage space may be U-shaped or V-shaped or bag-shaped or pear-shaped as seen in a longitudinal section through the filter element. On the crude side where the filter element is exposed to the oncoming flow of the medium to be filtered, the single pleat is very narrow and tapers as a pleat tip, which serves as a flow divider. The aforementioned storage space into which the medium to be filtered enters should thus be large in comparison with the two spaces adjacent to the aforementioned storage space.

Such an asymmetrical design results in an increase in the storage volume on the crude side and thus a longer service life. More dust can be accommodated than is the case with a symmetrical arrangement of the pleated sheets of a pleat pocket.

The larger storage volume is advantageous in particular at lower filtration rates, for example in commercial vehicle applications or industrial applications. In these applications the dust cake formation at the surface of the media is relevant. In practice these are filtration rates of the medium of <6 cm/s, for example.

This invention can be put to particularly good use in the case of flat filter elements, in particular those having great pleat heights but also in the case of round filter elements.

One important aspect is the internal support of the individual pleat packets. Therefore spacers made of plastic or supporting glue beads may be used. This is necessary because reduced pressures occurring in the flow region of the medium in the intake tract during operation of an internal combustion engine can result in collapse of the pleats. Then opposing filter media sections that are opposite one another on the clean side come in direct contact with one another. Stresses and deformations leading to a collapse on the crude side may also occur due to irregularities in materials.

BRIEF DESCRIPTION OF THE DRAWINGS

The invention will now be explained in greater detail with reference to the drawings in which the following are shown in detail:

FIG. 5 shows a fragment of spacers in a perspective diagram.

DETAILED DESCRIPTION

Figure 1:
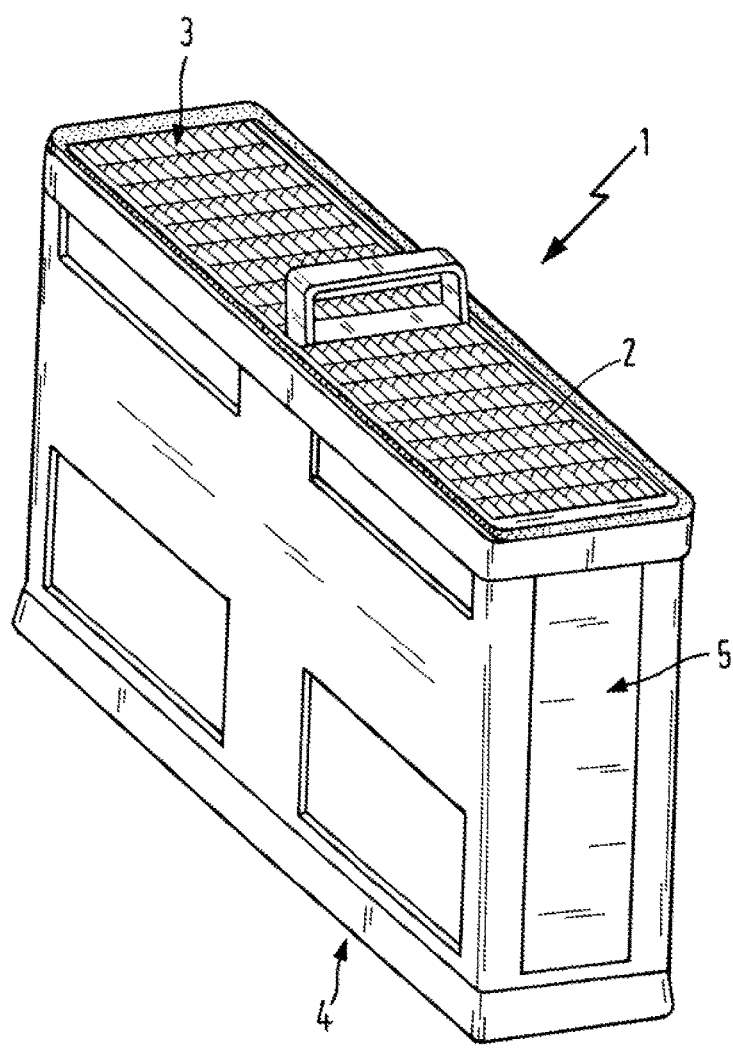
FIG. 1 shows a filter element in a perspective diagram.

The filter element 1 shown in FIG. 1 has a filter bellows 2. The clean side outflow side 4 is on the opposite side. The filter bellows 2 are situated in a plastic housing 5.

Figure 2:
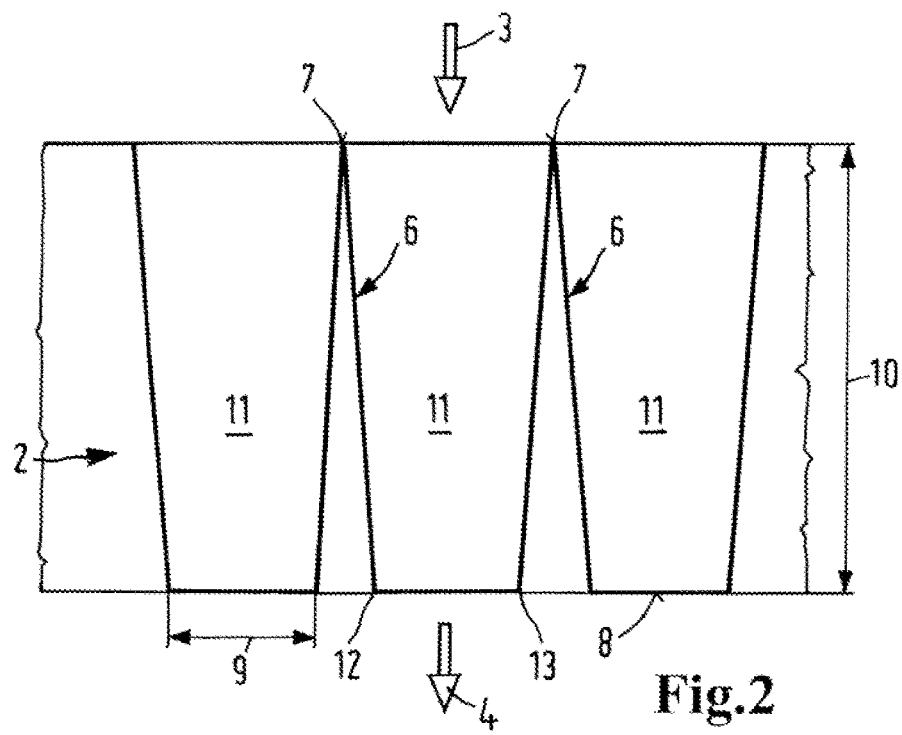
FIG. 2 shows filter bellows made of a filter medium in a first embodiment having a plurality of pleated pockets, shown in a schematic diagram.

The filter bellows 2 shown in a detail in FIG. 2 and in a side view has pleated sheets 12, 13. The medium to be filtered approaches from the crude side 3 (oncoming flow side) and is removed on the clean side 4 (outgoing flow side). The pleat tip 7, which is exposed to oncoming flow, tapers to a tip. The base of the pleat 8 however is very wide. See the pleat spacing 9 in the region of the base of the pleat. Pleat pockets 11 of a substantial volume are formed in this way. Each pleat pocket is formed by two pleated sheets 12 and 13. The pleat height 10 is relatively great. In practice, a ratio of pleat height 10 to pleat spacing 9 on the order of 25:1 to 130:1 is the goal.

The pleat pockets 11 are essentially U-shaped pleat pockets having three sides. They are angular; see edges 6. They can be created by providing embossing lines. The pleat sheets 12 and 13 form opposite sidewalls of the pleat pockets 11. The pleat base 8 is flat and connects bottom sidewall edges of the opposite sidewalls of the pleat pockets 11 at the outflow side 4 of the filter bellows 2.

Figure 3:
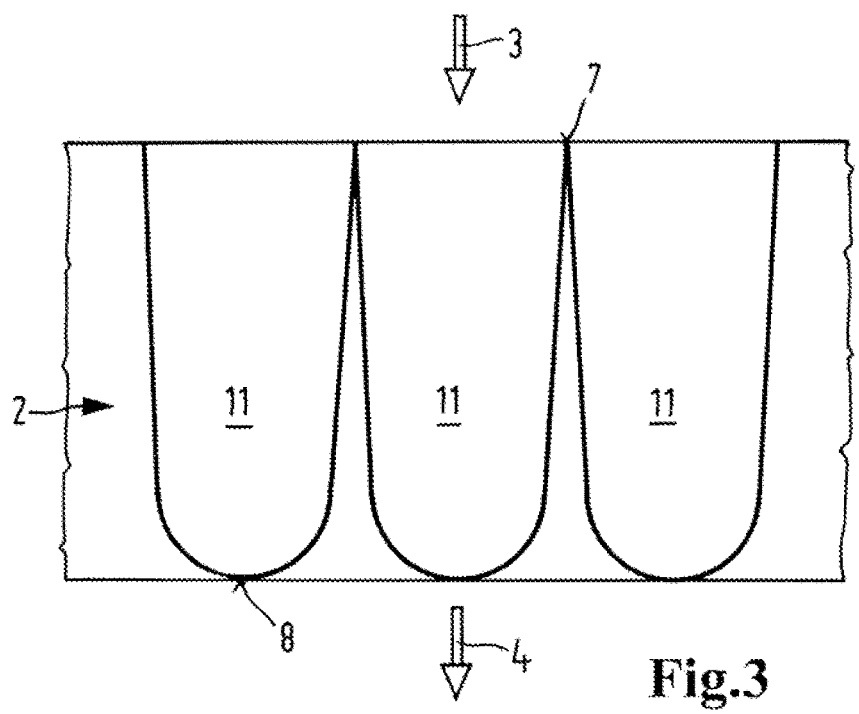
FIG. 3 shows filter bellows made of a filter medium of a second embodiment having a plurality of pleated pockets.

The filter bellows 2 according to FIG. 3 comprise pleat pockets 11 of a different design. The pleat tips 7 on the oncoming flow side—crude side—are again very pointed as is the case in the embodiment according to FIG. 2, but the pleat pocket 11 is essentially in the shape of a roof tile. The pleat base 8 is formed by an arc of a circle. It could also be shaped in an elliptical arc or a polygon.

Figure 4:
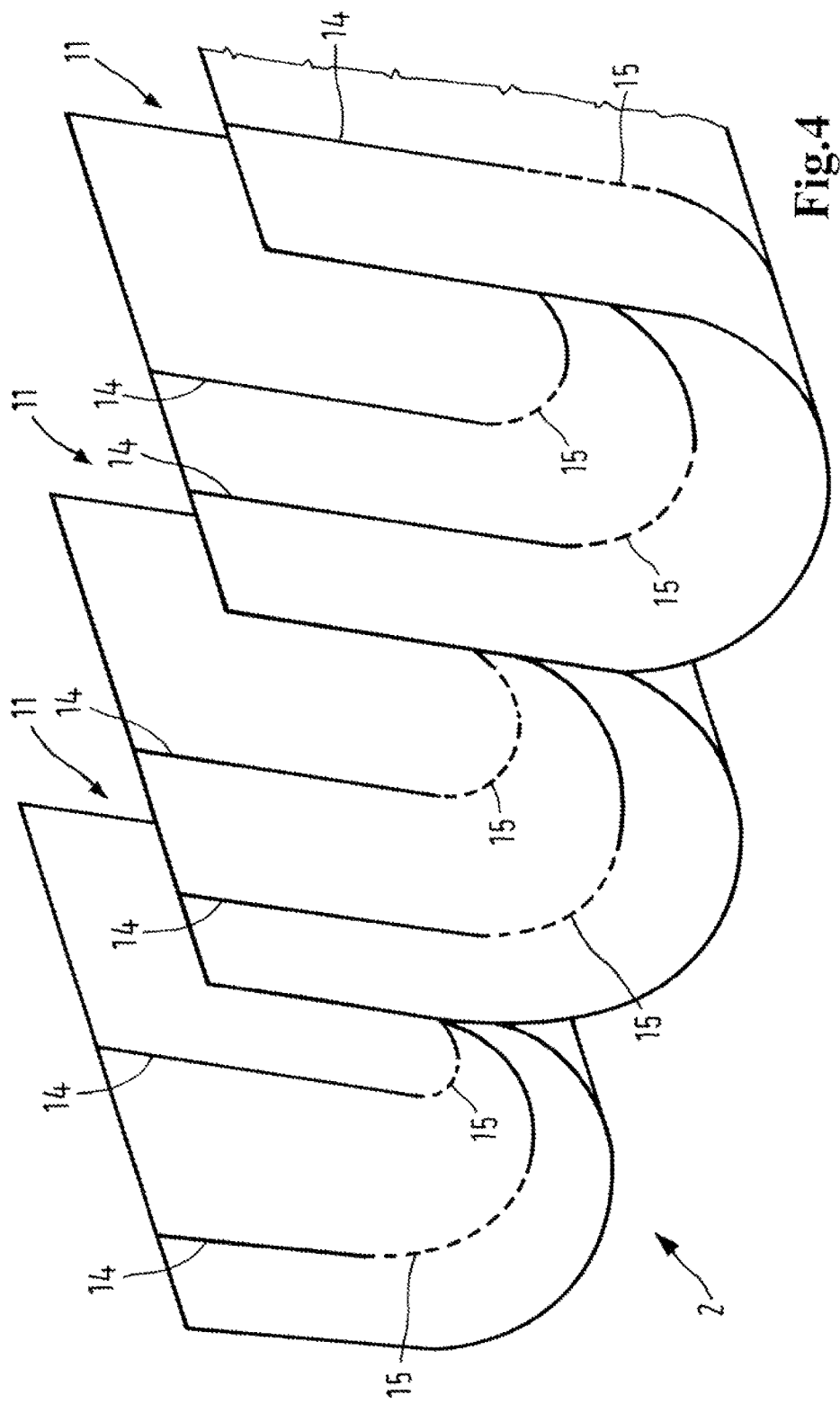
FIG. 4 shows a detail of a filter element having three pleated pockets in a perspective diagram.

FIG. 4 shows a detail of filter bellows 2 having three pleat pockets in a perspective diagram. Adhesive traces 14 are applied as spacers to the pleat sides—on both sides. The adhesive traces 14 run in the direction of the path, i.e., in the direction in which the filter element is created by conveying and pleating a strip of material in its longitudinal direction and pleating. The adhesive traces 14 are interrupted. See the interruptions 15 indicated with dashed lines.

FIG. 5 shows in a fragmentary three-dimensional diagram a detail of a group of spacers 14 in the form of objects made of paper, cardboard or plastic. It can be seen here that the spacers are provided for use with a V-shaped pleat.

What is claimed is:

1. A filter element for filtering gaseous or liquid fluid media, comprising:
    a pleated filter medium configured for filtering the fluid media, the pleated filter medium having a crude side at an incoming flow face and a clean side at an outflow face of the pleated filter medium;
    wherein each pleat of the pleated filter medium is formed by two pleated sheets which form a pleat tip with one another on the crude side exposed to oncoming flow;
    wherein two immediately neighboring pleats form a pleat base with one another;
    wherein the crude side and/or the clean side of the filter medium has a plurality of elongated adhesive sections along at least two adhesive traces on the filter medium, each having at least one continuous adhesive section and each having at least one adhesive interruption;
    wherein a spacing distance between the sheet edges of the two pleated sheets forming the pleat tip in the region of the pleat tip is between zero and two mm, or the two pleated sheets are in contact with one another in the region of the pleat tip;
    wherein between the two immediately adjacent pleat tips, a three-sided pleat pocket of the pleated filter medium is formed, the three-sided pleat pocket having:
        a first sidewall of filter medium extending from the pleat tip at the incoming flow face to a first sidewall edge at the outflow face;
        a second sidewall of filter medium extending from an immediately adjacent pleat tip at the incoming flow face to a second sidewall edge at the outflow face; and
        a flat pleat base of filter medium extending from the first sidewall edge to the second sidewall edge, connecting the first sidewall to the second sidewall, the flat pleat base and first and second sidewall edges are arranged on the outflow face;
    wherein the pleat spacing distance between the two pleated sheets of a pleat pocket is at least twice the pleat spacing distance in the region of the pleat tip in the region of the pleat base.

2. The filter element according to claim 1, wherein a ratio of a pleat height to the pleat spacing in the region of the pleat base is greater than 25:1.

3. A filter element for filtering gaseous or liquid fluid media, comprising:
    a pleated filter medium configured for filtering the fluid media, the pleated filter medium having a crude side at an incoming flow face and a clean side at an outflow face of the pleated filter medium;
    wherein each pleat of the pleated filter medium is formed by two pleated sheets which form a pleat tip with one another on the crude side exposed to oncoming flow;
    wherein two immediately neighboring pleats form a pleat base with one another;
    wherein the crude side and/or the clean side of the filter medium has a plurality of elongated adhesive sections along at least two adhesive traces on the filter medium, each having at least one continuous adhesive section and each having at least one adhesive interruption;
    wherein a spacing distance between the sheet edges of the two pleated sheets forming the pleat tip in the region of the pleat tip is between zero and two mm, or the two pleated sheets are in contact with one another in the region of the pleat tip;
    wherein between the two immediately adjacent pleat tips, a three-sided pleat pocket of the pleated filter medium is formed, the three-sided pleat pocket having:
        a first sidewall of filter medium extending from the pleat tip at the incoming flow face to a first sidewall edge at the outflow face;
        a second sidewall of filter medium extending from an immediately adjacent pleat tip at the incoming flow face to a second sidewall edge at the outflow face; and
        a pleat base of filter medium having a first end connected to the first sidewall edge and a second end connected to the second sidewall edge;
    wherein the pleat spacing distance between the two pleated sheets of a pleat pocket is at least twice the pleat spacing distance in the region of the pleat tip in the region of the pleat base;
    wherein a ratio of a pleat height to the pleat spacing in the region of the pleat base is greater than 25:1;
    wherein the pleat base is an arc of a circle or an elliptical arc.

4. The filter element according to claim 2, wherein the first sidewall and the second sidewall of at least one pleat pocket of the pleated filter medium are arranged parallel to one another or at an inclination to one another.

5. The filter element according to claim 2, wherein the adhesive traces are arranged so they are spaced apart equidistant on the filter medium.

6. The filter element according to claim 2, wherein distances between neighboring adhesive traces decrease or increase from one end side of the filter element to an opposing end side of the filter element, as seen in the direction of the pleat tip.

7. The filter element according to claim 2, wherein distances between neighboring adhesive traces increase in an outward direction with respect to a central mirror plane running perpendicular to the pleat edges;
    wherein the distances between neighboring adhesive traces increases toward the outside with respect to the extent of the filter medium in the direction of the pleat edges.

8. The filter element according to claim 1, wherein the filter element is a flat filter element.

9. The filter element according to claim 1, wherein a fluid filtration rate of the filter medium is less than 6 cm/s of fluid flow.

10. The filter element according to claim 2, wherein the ratio of a pleat height to the pleat spacing in the region of the pleat base is greater than either 50:1 or 150:1.

11. The filter element according to claim 3, wherein two pleated sheets of at least one pleat pocket of the pleated filter medium are arranged parallel to one another.

12. The filter element according to claim 3, wherein the adhesive traces are arranged so they are spaced apart equidistant on the filter medium.

13. The filter element according to claim 3, wherein distances between neighboring adhesive traces decrease or increase from one end side of the filter element to an opposing end side of the filter element, as seen in the direction of the pleat tip.

14. The filter element according to claim 3, wherein
distances between neighboring adhesive traces increase in
  an outward direction with respect to a central mirror
  plane running perpendicular to the pleat edges;
wherein the distances between neighboring adhesive
  traces increases toward the outside with respect to the
  extent of the filter medium in the direction of the pleat
  edges.

\* \* \* \* \*